United States Patent
Daley et al.

(10) Patent No.: US 10,452,245 B2
(45) Date of Patent: *Oct. 22, 2019

(54) ACTIONABLE BUSINESS ENTITY OPERATING MODELS TO DRIVE USER INTERFACE BEHAVIOR

(71) Applicant: INTERNATIONAL BUSINESS MACHINES CORPORATION, Armonk, NY (US)

(72) Inventors: Stan K. Daley, Atlanta, GA (US); Geoffrey M. Hambrick, Round Rock, TX (US); Pierre Haren, Sandy, UT (US); Claus T. Jensen, Pawling, NY (US); Nicolas Changhai Ke, Wissous (FR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 67 days.

This patent is subject to a terminal disclaimer.

(21) Appl. No.: 14/820,230

(22) Filed: Aug. 6, 2015

(65) Prior Publication Data

US 2016/0071031 A1    Mar. 10, 2016

Related U.S. Application Data

(63) Continuation of application No. 14/481,025, filed on Sep. 9, 2014.

(51) Int. Cl.
G06F 3/048      (2013.01)
G06F 3/0484    (2013.01)
(Continued)

(52) U.S. Cl.
CPC ........ *G06F 3/04847* (2013.01); *G06F 3/0481* (2013.01); *G06F 3/0484* (2013.01); *G06F 3/04842* (2013.01); *G06Q 10/067* (2013.01)

(58) Field of Classification Search
None
See application file for complete search history.

(56) References Cited

U.S. PATENT DOCUMENTS

| | | | |
|---|---|---|---|
| 8,131,668 B2* | 3/2012 | Beringer | G06F 8/24 707/609 |
| 8,578,278 B2* | 11/2013 | Rauh | G06F 8/38 715/744 |

(Continued)

OTHER PUBLICATIONS

List of IBM Patents or Patent Applications Treated as Related.
(Continued)

*Primary Examiner* — Kevin L Young
*Assistant Examiner* — Haimei Jiang
(74) *Attorney, Agent, or Firm* — Tutunjian & Bitetto, P.C.; Scott Dobson

(57) ABSTRACT

A method and system are provided. The method includes providing an actionable business entity operating model. The method further includes extending the actionable business entity operating model to drive user interface behavior on a user interface device having at least a display device, by extending class and property meta classes of the actionable business entity operating model to include user interface behavior semantics. The extending step includes configuring the user interface behavior semantics to be responsive to an operation state of the actionable business entity operating model.

12 Claims, 10 Drawing Sheets

(51) Int. Cl.
*G06F 3/0481* (2013.01)
*G06Q 10/06* (2012.01)

(56) References Cited

U.S. PATENT DOCUMENTS

| | | | | |
|---|---|---|---|---|
| 2007/0006180 A1* | 1/2007 | Green | ............... | G06F 17/2264 |
| | | | | 717/136 |
| 2008/0288889 A1* | 11/2008 | Hunt | ............... | G06Q 30/02 |
| | | | | 715/810 |
| 2009/0300060 A1* | 12/2009 | Beringer | ............... | G06F 8/24 |
| 2010/0174583 A1* | 7/2010 | Passova | ............... | G06Q 10/063 |
| | | | | 705/7.11 |
| 2012/0059842 A1* | 3/2012 | Hille-Doering | ..... | G06F 17/3064 |
| | | | | 707/769 |
| 2012/0185791 A1* | 7/2012 | Claussen | ............... | G06Q 10/063 |
| | | | | 715/772 |
| 2013/0159898 A1* | 6/2013 | Knospe | ............... | G06Q 10/103 |
| | | | | 715/765 |

OTHER PUBLICATIONS

U.S. Appl. No. 14/481,025, filed Sep. 9, 2015.
Balzert, H., et al. "The Janus Application Development Environment—Generating More than the User Interface" Computer-Aided Design of User Interfaces, Proceedings of the Second International Workshop on Computer-Aided Design of User Interfaces. Jun. 1996. (28 Pages).
Stary, C. "TADEUS: Seamless Development of Task-Rased and User-Oriented Interfaces" IEEE Transactions on Systems, Man, and Cybernetics—Part A: Systems and Humans, vol. 30, No. 5. Sep. 2000. pp. 509-525.

\* cited by examiner

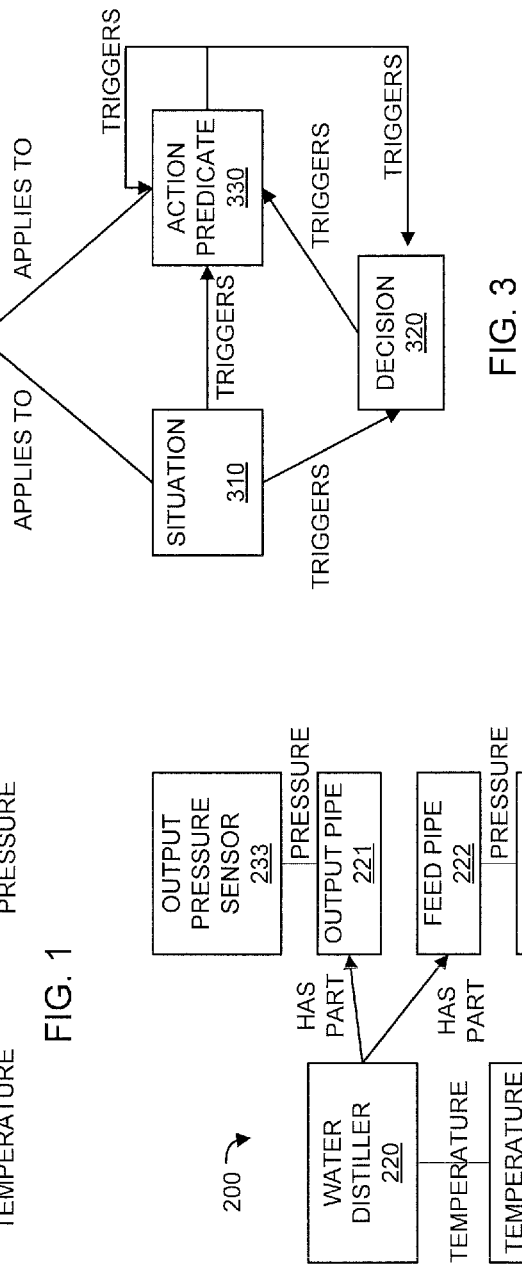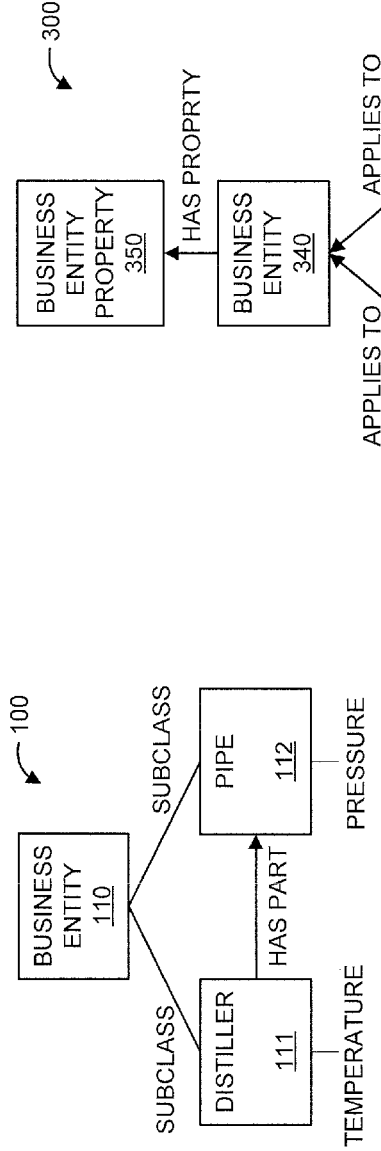

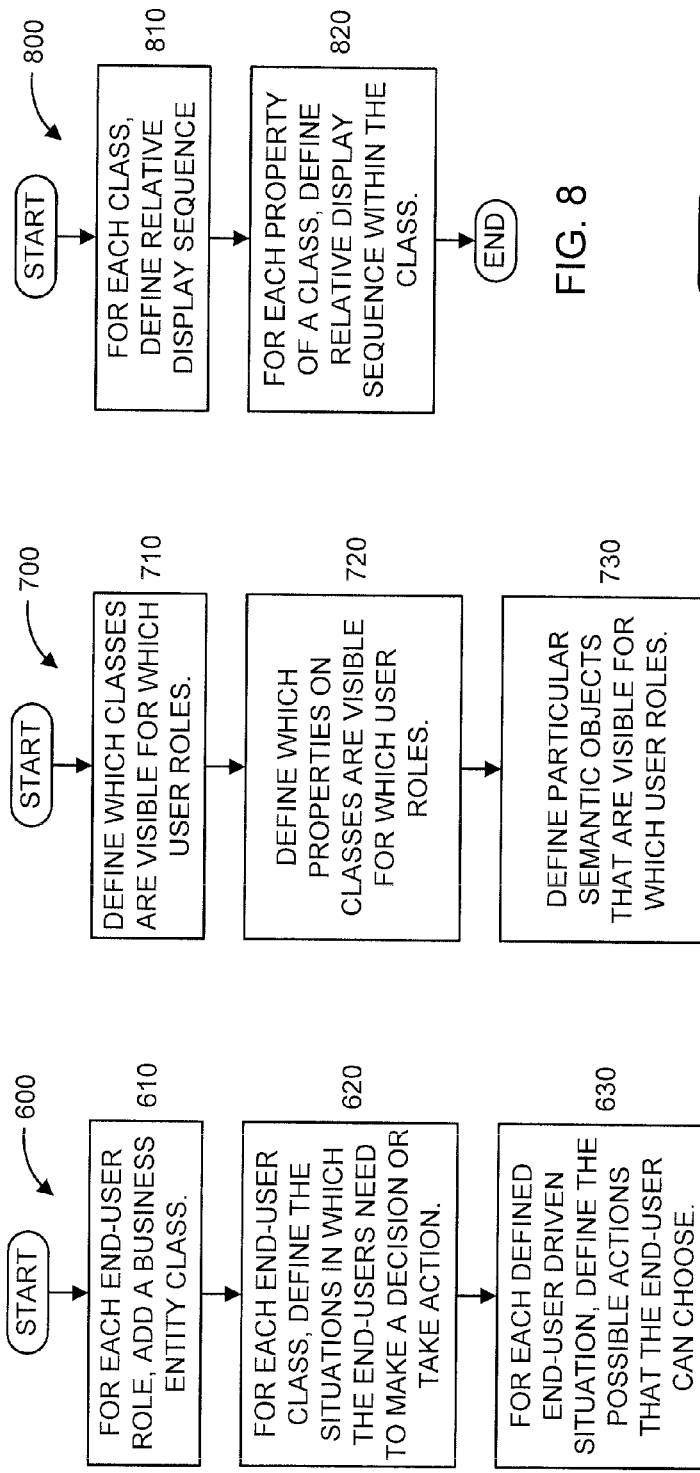

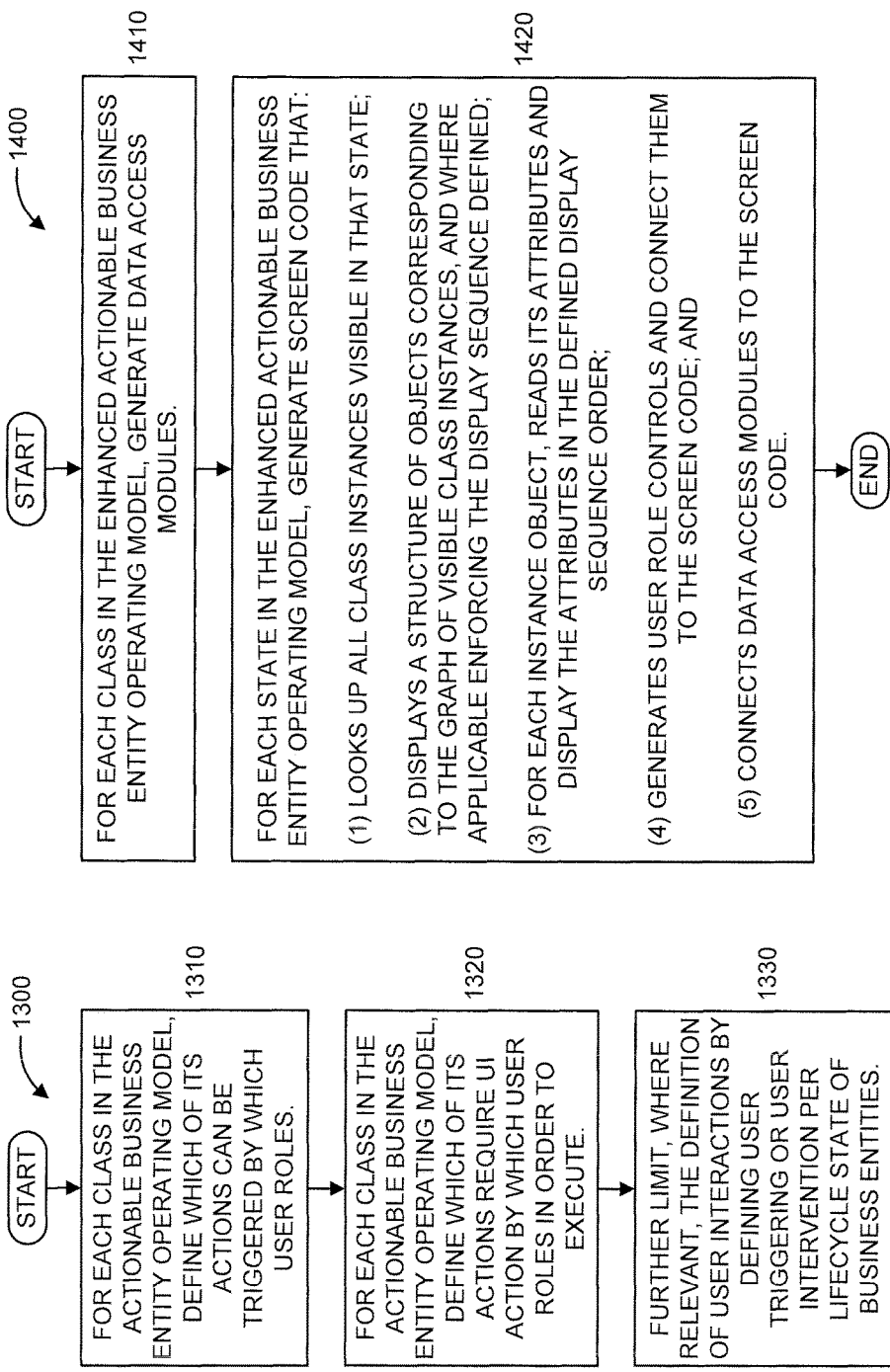

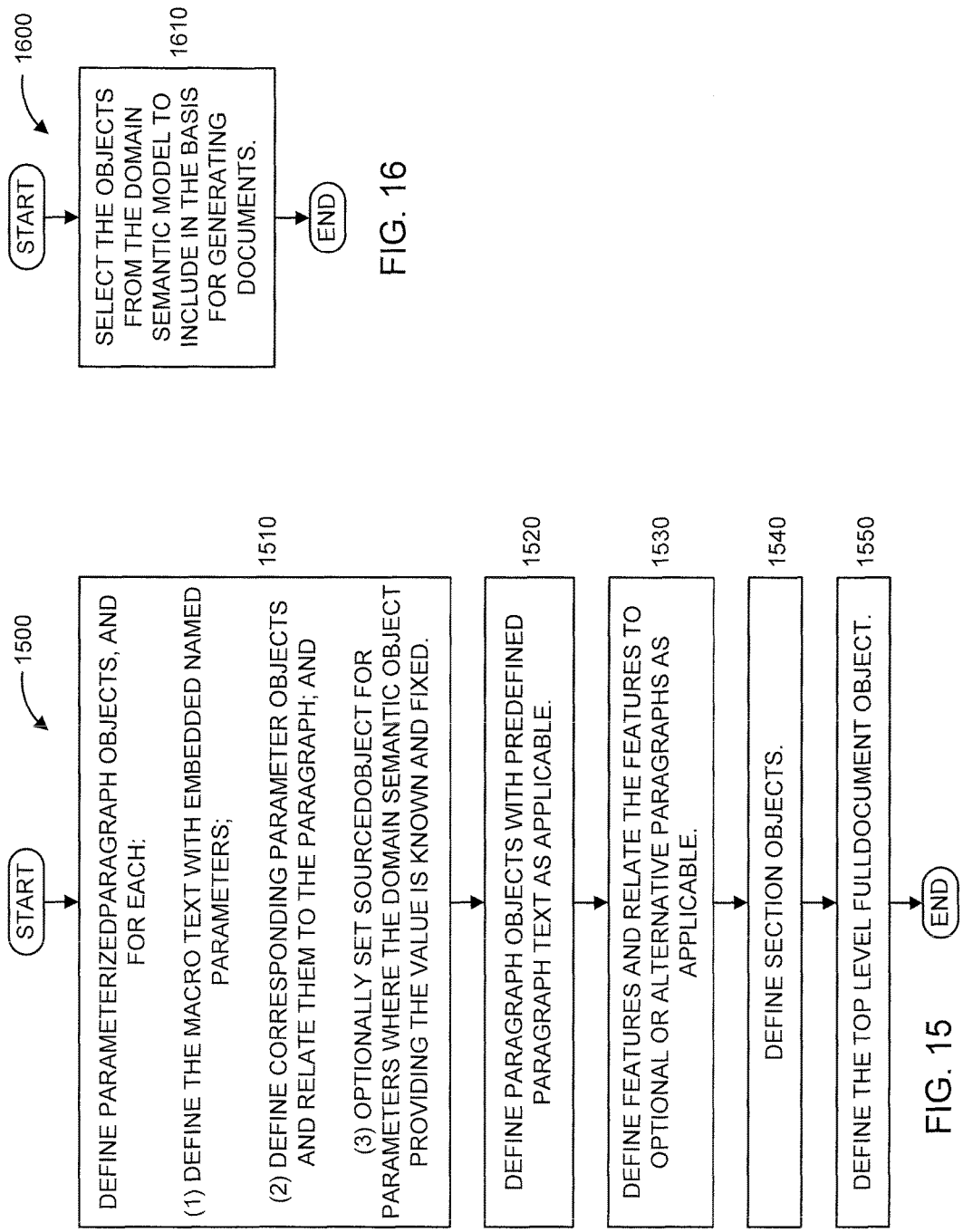

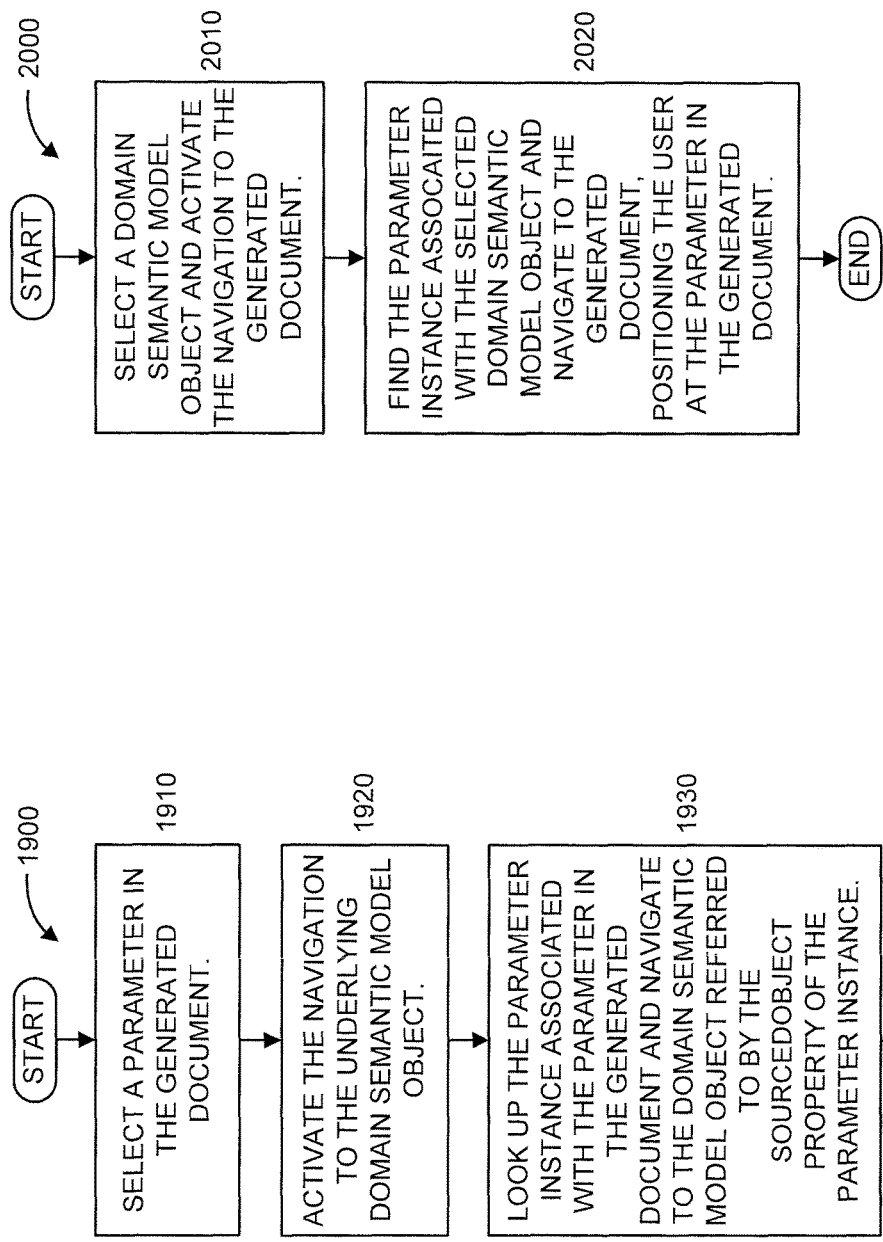

ACTIONABLE BUSINESS ENTITY OPERATING MODELS TO DRIVE USER INTERFACE BEHAVIOR

CROSS-REFERENCE TO RELATED APPLICATIONS

This application is a Continuation application of co-pending U.S. patent application Ser. No. 14/481,025, filed Sep. 9, 2014, which is incorporated herein by reference in its entirety.

BACKGROUND

Technical Field

The present invention relates generally to information processing and, in particular, to actionable business entity operating models to drive user interface (UI) behavior.

Description of the Related Art

The notion of user interface (UI) on data is well known in the industry and many solutions exist that let data models drive partial or full UI generation. The notion of UI configuration is also well known, allowing developers or users to set parameters that define the skin of a UI. The current state of the art brings these two concepts together for data driven configurable UI's, developed through UI frameworks and/or coded UI logic. Any action or intelligence in the UI behavior, the navigation through the various UI screens, has to be coded by the developer.

SUMMARY

According to an aspect of the present principles, a method is provided. The method includes providing an actionable business entity operating model. The method further includes extending the actionable business entity operating model to drive user interface behavior on a user interface device having at least a display device, by extending class and property meta classes of the actionable business entity operating model to include user interface behavior semantics. The extending step includes configuring the user interface behavior semantics to be responsive to an operation state of the actionable business entity operating model.

According to another aspect of the present principles, a system is provided. The system includes an actionable business entity operating model provider for providing an actionable business entity operating model. The system further includes a processor-based actionable business entity operating model extender for extending the actionable business entity operating model to drive user interface behavior on a user interface device having at least a display device, by extending class and property meta classes of the actionable business entity operating model to include user interface behavior semantics. The processor-based actionable business entity operating model extender configures the user interface behavior semantics to be responsive to an operation state of actionable business entity operating model.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 1 shows an exemplary defined reference semantic model 100 to which the present principles can be applied, in accordance with an embodiment of the present principles;

FIG. 2 shows an exemplary instantiation 200 of the defined reference semantic model 100 of FIG. 1, in accordance with an embodiment of the present principles'

FIG. 3 shows an exemplary basic actionable business entity model 300 formed from combining the reference semantic model instantiation 200 of FIG. 2 with a business entity base ontology, in accordance with an embodiment of the present principles;

FIG. 6 shows an exemplary method 600 for adding end-user business entity classes, in accordance with an embodiment of the present principles;

FIG. 7 shows an exemplary method 700 for defining visibility of semantic objects, in accordance with an embodiment of the present principles;

FIG. 8 shows an exemplary method 800 for defining a display sequence of semantic objects, in accordance with an embodiment of the present principles;

FIG. 9 shows an exemplary method 900 for defining a display name of semantic objects, in accordance with an embodiment of the present principles;

FIG. 13 shows an exemplary method 1300 for defining which actions in the actionable business entity operating model will have interactions with the user through the UI, in accordance with an embodiment of the present principles;

FIG. 14 shows an exemplary method 1400 for generating UI (code or display objects) from an enhanced actionable business entity operating model, in accordance with an embodiment of the present principles;

FIG. 15 shows an exemplary method 1500 for defining a document template, in accordance with an embodiment of the present principles;

FIG. 16 shows an exemplary method 1600 for defining a scope within a domain semantic model, in accordance with an embodiment of the present principles;

FIG. 19 shows an exemplary method 1900 for navigating from a document parameter to a domain ontology object, in accordance with an embodiment of the present principles; and FIG. 20 shows an exemplary method 2000 for navigating from a domain ontology object to a document, in accordance with an embodiment of the present principles.

DETAILED DESCRIPTION OF PREFERRED EMBODIMENTS

Figure 4:
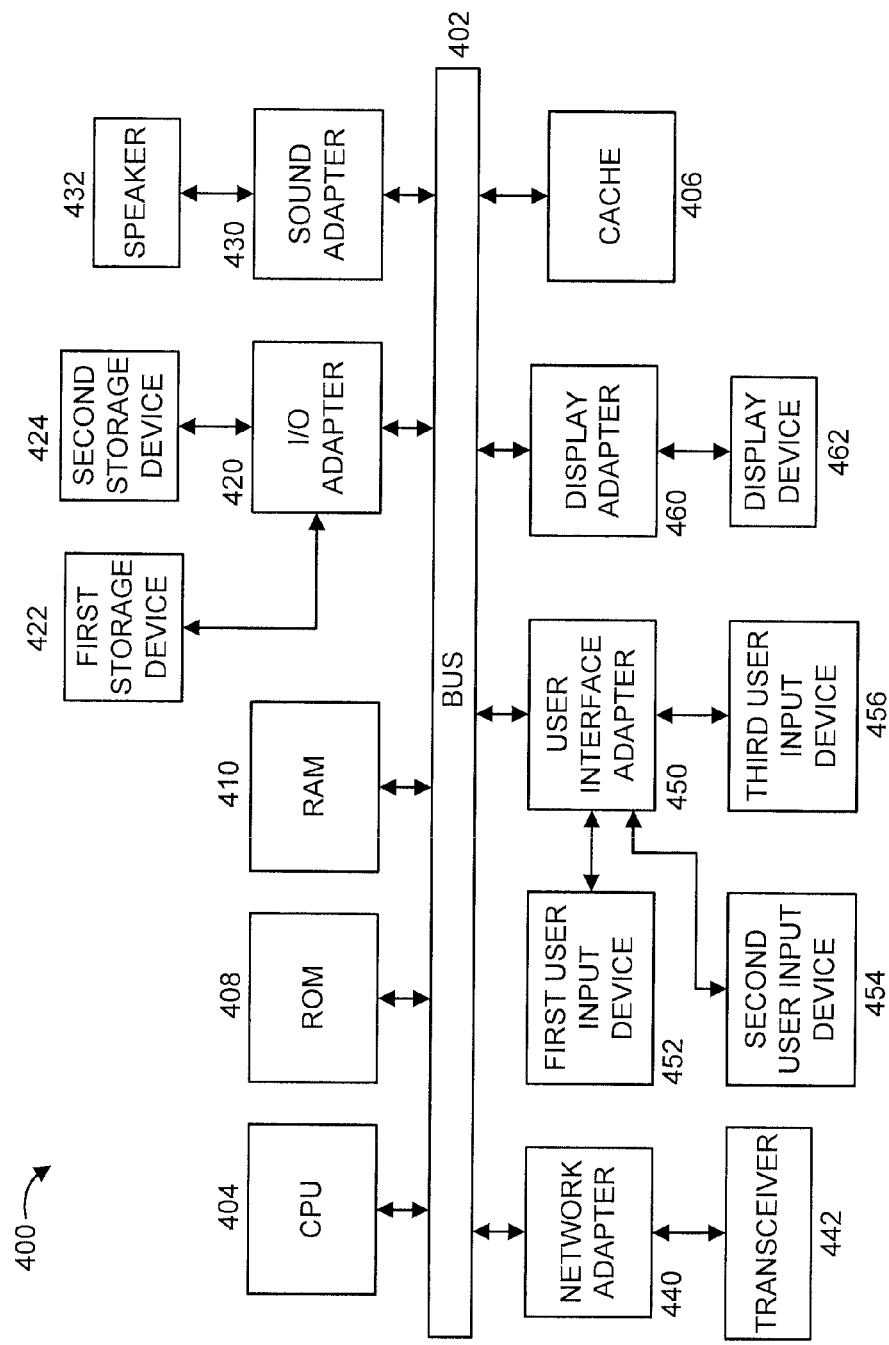
FIG. 4 shows an exemplary processing system 400 to which the present principles may be applied, in accordance with an embodiment of the present principles.

The present principles are directed to actionable business entity operating models to drive UI behavior. Advantageously, the present principles address the gap in the current state of the art in that UI's can be generated on top of data models, but will not have intelligent behavior, and conversely actionable business entity operating models can be produced but these do not include sufficient meta data to drive/generate UI behavior.

As used herein, the term "basic actionable business entity operating model" refers to a business entity centric operating model that is directly actionable in a computational sense. The basic actionable business entity operating model can be formed by combining a reference semantic model (or instantiation thereof) with a base business entity ontology. The resultant basic actionable business entity operating model allows for expression of situations and actions pertaining to business entities. It is to be noted that the defined reference semantic model (once created) is domain specific and the way it is made actionable is domain neutral (aka, it can be applied to any business domain)]. It is to be appreciated that a basic actionable business entity operating model is without enhancements for specifying UI behavior.

FIG. 1 shows an exemplary defined reference semantic model 100 to which the present principles can be applied, in accordance with an embodiment of the present principles. The defined reference semantic model 100 includes a business entity 110, a distiller 111, and a pipe 112. The distiller 111 and pipe 112 are subclasses of the business entity 110.

FIG. 2 shows an exemplary instantiation 200 of the defined reference semantic model 100 of FIG. 1 (hereinafter "reference semantic model instantiation"), in accordance with an embodiment of the present principles. The instantiation 200 includes a water distiller 220, an output pipe 221, and a feed pipe 222. A temperature sensor 231 is shown related to the water distiller 220 through the property of temperature. A feed pressure sensor 232 is shown related to the feed pipe 222 through the property of pressure. An output pressure sensor 233 is shown related to the output pipe 221 through the property of pressure.

FIG. 3 shows an exemplary basic actionable business entity model 300 formed from combining the reference semantic model instantiation 200 of FIG. 2 with a business entity base ontology, in accordance with an embodiment of the present principles. Hence, a situation 310 that applies to a business entity 340 will trigger a decision 320 and/or an action predicate 330. The decision 320 can also trigger the action predicate 330, and vice-versa. The action predicate 330 also applies to the business entity 340. The business entity 340 has a business entity property 350.

Also, as used herein, the term "UI enhanced actionable business entity operating model" refers to a basic actionable business entity operating model that is extended with semantics for UI behavior.

The present principles extend the capabilities of actionable business entity operating models by extending such systems in a way that allows them to directly drive UI behavior. Furthermore that UI behavior is adjusted depending on the state of the business entities in the business entity operation model.

The basic mechanism extending actionable business entity operating model to drive UI behavior is as follows. In any semantic system, the foundational class and property meta classes are themselves semantic objects and, as such, can be extended. Semantic systems that can drive UI behavior are created via extending the classical class and property meta class definitions to include UI behavior characteristics, thereby compelling semantic models based upon these extended meta classes to include UI behavior semantics in addition to the traditional domain semantics. This is a significant advantage as it allows the direct and integral definition of the UI aspect of semantic (business) objects rather than requiring additional steps of transformation and development the way that the data driven UI approach does.

A business value of the present principles includes enhancement/enrichment of any system based on actionable business entity operating models. The business value is very significantly extended over prior art solutions by driving the business entity operation model to include end-user experience as well as treating the end users themselves as actionable business entities that can permutate the state of the entire system by human decision and action. By extending actionable business entity operating models with intelligent human based entities, it is possible to leverage the fact that not only do humans determine business context better than software based systems, but humans can also actively change roles within the system, for instance letting end users with the appropriate authority intelligently switch roles from operation to auditor and have the operating model driven behavior of the UI immediate change the UI experience to allow for auditor functions without any need to log in or re-identify.

FIG. 4 shows an exemplary processing system 400 to which the present principles may be applied, in accordance with an embodiment of the present principles. The processing system 400 includes at least one processor (CPU) 404 operatively coupled to other components via a system bus 402. A cache 406, a Read Only Memory (ROM) 408, a Random Access Memory (RAM) 410, an input/output (I/O) adapter 420, a sound adapter 430, a network adapter 440, a user interface adapter 450, and a display adapter 460, are operatively coupled to the system bus 402.

A first storage device 422 and a second storage device 424 are operatively coupled to system bus 402 by the I/O adapter 420. The storage devices 422 and 424 can be any of a disk storage device (e.g., a magnetic or optical disk storage device), a solid state magnetic device, and so forth. The storage devices 422 and 424 can be the same type of storage device or different types of storage devices.

A speaker 432 is operative coupled to system bus 402 by the sound adapter 430.

A transceiver 442 is operatively coupled to system bus 402 by network adapter 140.

A first user input device 452, a second user input device 454, and a third user input device 456 are operatively coupled to system bus 402 by user interface adapter 450. The user input devices 452, 454, and 456 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 452, 454, and 456 can be the same type of user input device or different types of user input devices. The user input devices 452, 454, and 456 are used to input and output information to and from system 400.

A display device 462 is operatively coupled to system bus 402 by display adapter 460.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present principles provided herein.

Figure 5:
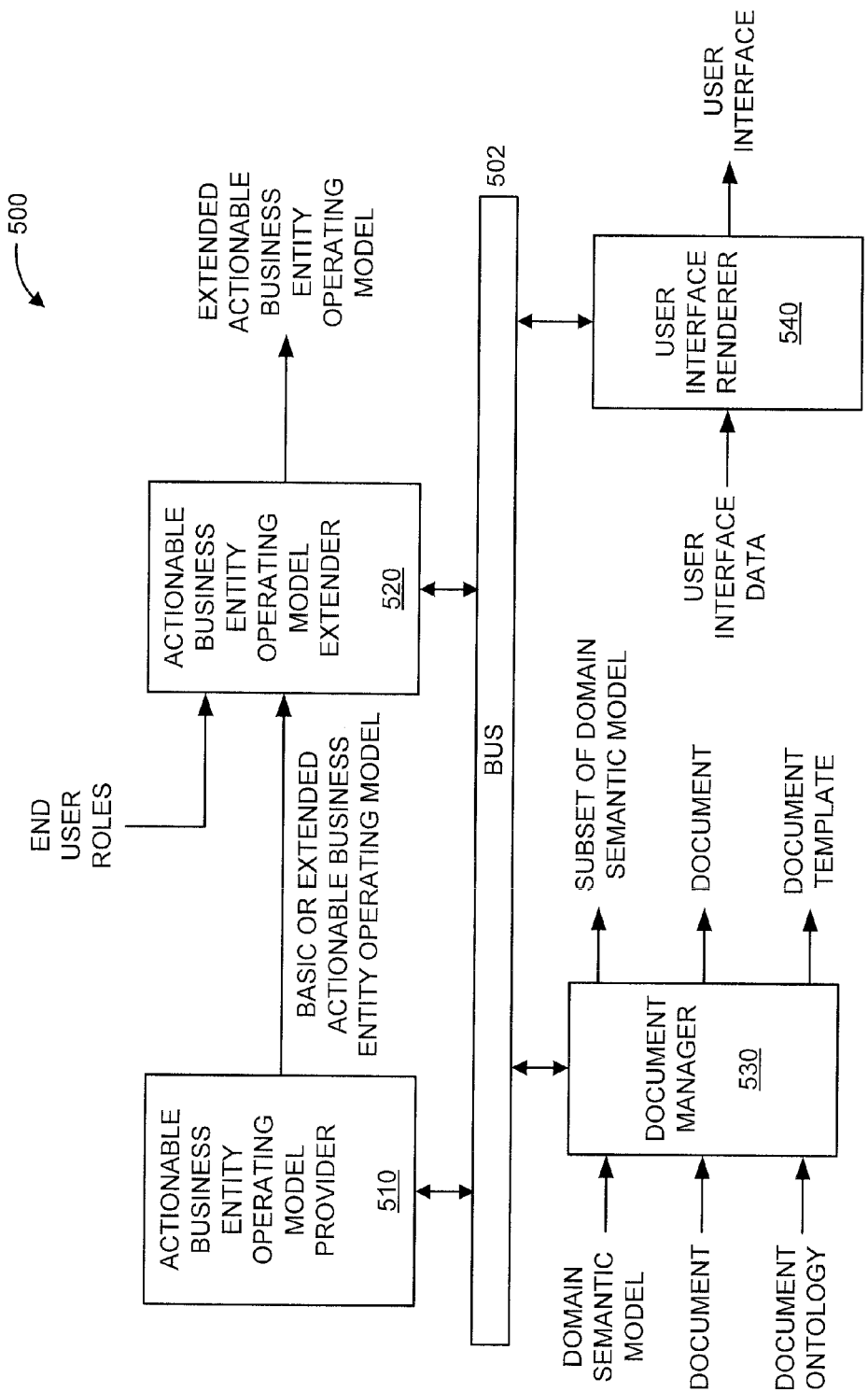
FIG. 5 shows an exemplary system 500 for using actionable business entity operating models to drive UI behavior, in accordance with an embodiment of the present principles.

Moreover, it is to be appreciated that system 500 described below with respect to FIG. 5 is a system for implementing respective embodiments of the present principles. Part or all of processing system 400 may be implemented in one or more of the elements of system 500.

Further, it is to be appreciated that processing system 400 may perform at least part of the method described herein including, for example, at least part of any of methods 600-1900 of FIGS. 6-20. Similarly, part or all of system 500 may be used to perform at least part of any of methods 600-1900 of FIGS. 6-20.

FIG. 5 shows an exemplary system 500 for using actionable business entity operating models to drive UI behavior, in accordance with an embodiment of the present principles. The system 500 includes an actionable business entity operating model provider 510 and an actionable business entity operating model extender 520.

In an embodiment, the actionable business entity operating model provider 510 receives one or more actionable business entity operating models from an external source. In an embodiment, the actionable business entity operating model provider 510 generates one or more actionable business entity operating models. In an embodiment, the actionable business entity operating model provider 510 stores one or more actionable business entity operating models.

The actionable business entity operating models provided by the actionable business entity operating model provider 510 can be basic actionable business entity operating models or extended actionable business entity operating models. The extended actionable business entity operating models provided by the actionable business entity operating model provider 510 to the actionable business entity operating model extender 520 can be models that were previously extended (by the actionable business entity operating model extender 520) in accordance with the present principles, but are being further extended. The actionable business entity operating model extender 520 extends whichever type (basic or enhanced) of model is input thereto. Such extension can involve other inputs to the actionable business entity operating model extender 520 including, but not limited to, a list of user roles In an embodiment, the actionable business entity operating model extender 520 is processor-based. In an embodiment, the actionable business entity operating model extender 520 receives an actionable business entity operating model from the actionable business entity operating model provider 510 and extends the same in one or more of the many ways described herein including, for example, with respect to methods 600-1900 shown and described with respect to FIGS. 6-20. For example, the actionable business entity operating model extender 520 can perform functions such as, for example, but not limited to, adding end-user business entity classes, defining visibilities of semantic objects, defining display sequences of semantic objects, defining display names of semantic objects, defining display widths of semantic objects, defining UI editing and creation rules for semantic objects, defining special editors for semantic objects, defining which actions in the actionable business entity operating model will have interactions with the user through the UI, and generating UI code or display objects from an enhanced actionable business entity operating model.

The system 500 can further include a document manager 530 for use, for example, in the case when the user interface has the form of a parameterized document. The document manager 530 can perform functions such as, for example, but not limited to, defining a document template, defining a scope within a domain semantic model, generating or re-generating a parameterized document, navigating from a document parameter to a domain ontology object, and navigating from a domain ontology object to a document. In an embodiment, the document template can be generated in the form of a graph of instance objects based on document ontology.

The system 500 can additionally include a user interface renderer 540. The user interface renderer 540 renders a user interface responsive to user interface data. A rendered user interface can then be displayed on, for example, display device 462.

In the embodiment of FIG. 5, the elements of system 500 are interconnected by a bus 502. However, other arrangements and connection types can also be used, while maintaining the spirit of the present principles. These and other variations to system 500 are readily determined by one of ordinary skill in the art given the teachings of the present principles provided herein, while maintaining the spirit of the present principles.

A description will now be given of activities that can be included and/or otherwise involved in extending actionable business entity operating models to drive UI behavior, in accordance with an embodiment of the present principles. It is to be appreciated that all of the activities are supported by appropriate artifacts, tools and runtimes.

A description will now be given of the activity of adding end-user business entity classes, in accordance with an embodiment of the present principles. This activity can be performed, e.g., at development or configuration time.

The input to this activity includes: end user roles that are to participate in the actionable operating model; and existing basic actionable business entity operating model.

The output from this activity includes: an end-user enhanced actionable business entity operating model.

End-users can be defined as extension classes in an actionable business entity operating model. For each such end-user business entity class, the appropriate actions and relationships can be defined, including provisioning for actions based on human decision.

FIG. 6 shows an exemplary method 600 for adding end-user business entity classes, in accordance with an embodiment of the present principles.

At step 610, for each end-user role, add a business entity class.

At step 620, for each end-user class, define the situations in which the end-users need to make a decision or take action.

At step 630, for each defined end-user driven situation, define the possible actions that the end-user can choose.

A description will now be given of the activity of defining visibility of semantic objects, in accordance with an embodiment of the present principles. This activity can be performed, e.g., at development or configuration time.

The input to this activity includes: a basic or UI enhanced actionable business entity operating model; and list of user roles.

The output from this activity includes: a UI enhanced actionable business entity operating model.

The visibility of semantic objects can be defined at the class, property or instance level. At the class level, if visibility is set to true, then all instances of this class are fully visible in the UI (if set to false, then similarly invisible). At the property level, if visibility is set to true, then this property is visible in the UI for all instances of the corresponding class (if set to false, then similarly invisible). At the instance level, if visibility is set to true, then this particular (instance) semantic object is visible in the UI (if set to false, then similarly invisible).

FIG. 7 shows an exemplary method 700 for defining visibility of semantic objects, in accordance with an embodiment of the present principles.

At step 710, define which classes are visible for which user roles.

At step 720, define which properties on classes are visible (for classes that have not already been defined to be fully visible) for which user roles.

At step 730, define particular (instance) semantics objects that are visible (for semantic objects that do not already have visibility set to true at their respective class level) for which user roles.

A description will now be given of the activity of defining a display sequence of semantic objects, in accordance with an embodiment of the present principles. This activity can be performed, e.g., at development or configuration time.

The input to this activity includes: a basic or UI enhanced actionable business entity operating model.

The output from this activity includes: a UI enhanced actionable business entity operating model.

FIG. 8 shows an exemplary method 800 for defining a display sequence of semantic objects, in accordance with an embodiment of the present principles.

At step 810, for each class, define relative display sequence (aka which "number" this class has in the display sequence; multiple classes can have the same "number", this will be resolved at runtime).

At step 820, for each property of a class, define relative display sequence within the class.

A description will now be given of the activity of defining a display name of semantic objects, in accordance with an embodiment of the present principles. This activity can be performed, e.g., at development or configuration time.

The input to this activity includes: a basic or UI enhanced actionable business entity operating model.

The output from this activity includes: a UI enhanced actionable business entity operating model.

FIG. 9 shows an exemplary method 900 for defining a display name of semantic objects, in accordance with an embodiment of the present principles.

At step 910, for each property of a class, define display name (label this property will have in front of its value field in the UI).

A description will now be given of the activity of defining a display width of semantic objects, in accordance with an embodiment of the present principles. This activity can be performed, e.g., at development or configuration time.

The input to this activity includes: a basic or UI enhanced actionable business entity operating model.

The output from this activity includes: a UI enhanced actionable business entity operating model.

Figure 10:
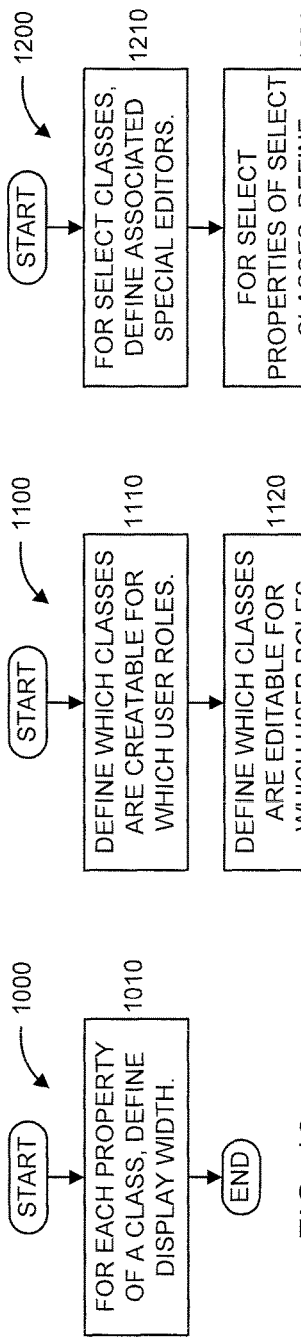
FIG. 10 shows an exemplary method 1000 for defining a display width of semantic objects, in accordance with an embodiment of the present principles.

FIG. 10 shows an exemplary method 1000 for defining a display width of semantic objects, in accordance with an embodiment of the present principles.

At step 1010, for each property of a class, define display width (width this property will have for its value field in the UI).

A description will now be given of the activity of defining UI editing and creation rules for semantic objects, in accordance with an embodiment of the present principles. This activity can be performed, e.g., at development or configuration time.

The input to this activity includes: a basic or UI enhanced actionable business entity operating model; and a list of user roles.

The output from this activity includes: a UI enhanced actionable business entity operating model.

The control of creation or change of semantic objects can be defined at the class, property or instance level. At the class level, if control is set to true, then all instances of this class are fully creatable/editable in the UI (if set to false, then similarly not). At the property level, if control is set to true, then this property is creatable/editable in the UI for all instances of the corresponding class (if set to false, then similarly not). At the instance level, if control is set to true, then this particular (instance) semantic object is editable in the UI (if set to false, then similarly not).

Figure 11:
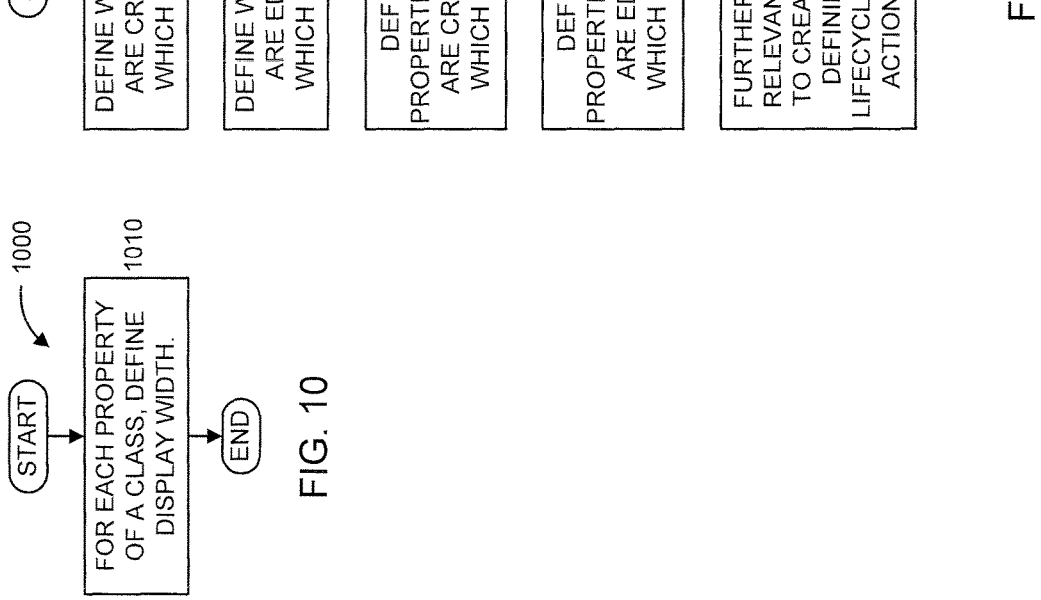
FIG. 11 shows an exemplary method 1100 for defining UI editing and creation rules for semantic objects, in accordance with an embodiment of the present principles.

FIG. 11 shows an exemplary method 1100 for defining UI editing and creation rules for semantic objects, in accordance with an embodiment of the present principles.

At step 1110, define which classes are creatable for which user roles.

At step 1120, define which classes are editable for which user roles.

At step 1130, define which properties on classes are creatable (for classes that have not already been defined to be fully creatable) for which user roles.

At step 1140, define which properties on classes are editable (for classes that have not already been defined to be fully editable) for which user roles.

At step 1150, define particular (instance) semantics objects that are editable (for semantic objects that do not already have editability set to true at their respective class level) for which user roles.

At step 1160, further limit, where relevant, the ability to create or edit by defining at which lifecycle states each action is possible (note that the lifecycle states for each type of business entity is defined in the basic actionable business entity operating model).

A description will now be given of the activity of defining special editors for semantic objects, in accordance with an embodiment of the present principles. This activity can be performed, e.g., at development or configuration time.

The input to this activity includes: a basic or UI enhanced actionable business entity operating model.

The output from this activity includes: a UI enhanced actionable business entity operating model.

An assigned special editor will be invoked by the UI for editing instances of this particular class or property. This is usually a one-to-one correspondence between class or attribute type and special editor (e.g. a special editor for date instance objects).

Figure 12:
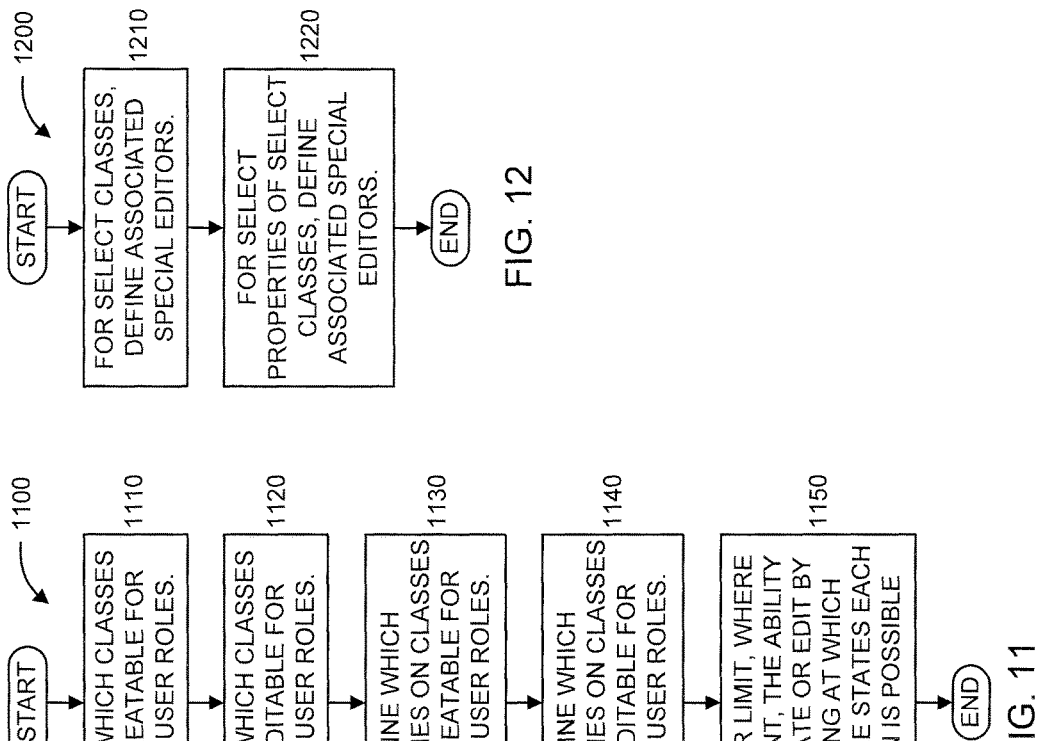
FIG. 12 shows an exemplary method 1200 for defining special editors for semantic objects, in accordance with an embodiment of the present principles.

FIG. 12 shows an exemplary method 900 for defining special editors for semantic objects, in accordance with an embodiment of the present principles.

At step 1210, for select classes, define associated special editors.

At step 1220, for select properties of select classes, define associated special editors.

A description will now be given of the activity of defining which actions in the actionable business entity operating model will have interactions with the user through the UI, in accordance with an embodiment of the present principles. This activity can be performed, e.g., at development or configuration time.

The input to this activity includes: a basic or UI enhanced actionable business entity operating model; and a list of user roles.

The output from this activity includes: a UI enhanced actionable business entity operating model.

The basic actionable business entity operating model defines possible actions at a business entity type/class level. In the context of a UI, it is necessary to define required user interaction for these actions.

FIG. 13 shows an exemplary method 1300 for defining which actions in the actionable business entity operating model will have interactions with the user through the UI, in accordance with an embodiment of the present principles.

At step 1310, for each class in the actionable business entity operating model, define which of its actions can be triggered by which user roles.

At step 1320, for each class in the actionable business entity operating model, define which of its actions require UI action by which user roles in order to execute.

At step 1330, where relevant, further refine the definition of user interactions by defining user triggering or user intervention per lifecycle state of business entities.

A description will now be given of the activity of generating UI (code or display objects) from an enhanced actionable business entity operating model, in accordance with an embodiment of the present principles. This activity can be performed, e.g., at code generation, deploy time or runtime.

The input to this activity includes: an enhanced actionable business entity operating model.

The output from this activity includes: code for running the UI.

FIG. 14 shows an exemplary method 1400 for generating UI (code or display objects) from an enhanced actionable business entity operating model, in accordance with an embodiment of the present principles.

At step 1410, for each class in the enhanced actionable business entity operating model, generate data access modules (using classic data access module generation techniques, but using the semantic model as a base rather than a data model).

At step 1420, for each state in the enhanced actionable business entity operating model, generate screen code that: (1) looks up all class instances visible in that state; (2) displays a structure of objects corresponding to the graph of visible class instances, and where applicable enforcing the display sequence defined (two instances with same display sequence "number" assigned will be randomly ordered); (3) for each instance object, read its attributes and display the attributes in the defined display sequence order; (4) generate user role controls and connect them to the screen code; and (5) connect data access modules to the screen code.

In the case of a UI interpretation engine, the interpretation steps are analogous to the code generation steps above, where the interpretation engine simply generates UI objects rather than UI code.

A description will now be given of activities that can be included and/or otherwise involved in extending actionable business entity operating models to drive UI behavior in the case where the UI has the form of a parameterized document, in accordance with an embodiment of the present principles. It is to be appreciated that all of the activities are supported by appropriate artifacts, tools and runtimes.

A description will now be given of a document ontology defined as follows, in accordance with an embodiment of the present principles.

Document class with properties
    composedOf: Relationships to the document parts that are part of a higher level document object
    isPartOf: Relationships to the higher level document objects that have this document object as a part
    documentOrder: The order (increasing integers) in which document parts are aggregated.
    generatedDocument: Holds the generated document corresponding to this document object (supports recursive composition and the ability to only regenerate when needed); can be predefined, for instance for predefined paragraph text FullDocument class, subclass of Document, with additional properties
    title: The title of a full document (instances of FullDocument are intended as "top level" document objects)

Section class, subclass of Document, with additional properties
    title: The title of the corresponding section of a generated document
    sectionNumber: The order and sequencing of sections when generating documents
    includedifEmpty: Controls whether a section is included if it has no generated parts (note that with document parts being potentially optional, even sections that have potential parts may not have actual parts in a specific document generation situation)

Paragraph class, subclass of Document, with additional properties
    startsWithNewLine: Indicates whether when generating a document, a paragraph should begin on a new line or not
    Features: Relationships to feature objects (used for controlling optional and alternative document parts)
    RelatedObjects: Relationships to objects that determine whether there is a matching feature or not Feature class with properties:
    featureValue: Used to control allowable document parts, for instance in some cases both a more strict and a less strict paragraph may be allowed in a contract document (any document part with same or higher feature value is allowed as a match to a domain semantic object with same or lower feature value)

ParameterizedParagraph class, subclass of Paragraph, with additional properties:
    textWithParameters: Macro text with named placeholders for parameter values
    Parameters: Relationships to the parameter objects corresponding to the parameters of the ParameterizedParagraph Parameter class with properties:
    parameterName: Name of parameter, corresponding to named placeholder in macro text for textWithParameters in a ParameterizedParagraph
    SourcedClass: Defines the class from which objects providing the parameter must be chosen
    SourcedProperty: Defines the property on SourcedClass object instances from which the parameter value will be computed SourcedObject: Optionally defines a fixed object providing the parameter value (rather than choosing between possible matching instances of SourcedClass)

A description will now be given of the activity of defining a document template, in accordance with an embodiment of the present principles.

The input to this activity includes: a document ontology; and optionally, a domain semantic model.

The output from this activity includes: a document template in the form of a graph of instance objects based on the document ontology.

FIG. 15 shows an exemplary method 1500 for defining a document template, in accordance with an embodiment of the present principles.

At step 1510, define ParameterizedParagraph objects, and for each: (1) define the macro text with embedded named parameters; (2) define corresponding parameter objects and relate them to the paragraph; and (3) optionally set sourcedObject for parameters where the domain semantic object providing the value is known and fixed.

At step 1520, define paragraph objects with predefined paragraph text as applicable.

At step 1530, define features and relate the features to optional or alternative paragraphs (and parameterized paragraphs) as applicable.

At step 1540, define section objects.

At step 1550, define the top level FullDocument object.

It is to be noted that the FullDocument objects is the top node for the full graph of possible document parts. This does not mean that all parts will always be included (see the activity around generating a document), but does mean that non-document parts not in that graph can be part of a generated document.

A description will now be given of the activity of defining a scope within a domain semantic model, in accordance with an embodiment of the present principles.

The input to this activity includes: a domain semantic model.

The output from this activity includes: a subset of domain semantic models to be used for document generation, in the form of one or more instance graphs.

This activity is needed in order to practically include the number of domain semantic objects that can be used for parameter matching. Typically the scope corresponds to one or more business entities (such as a contract or a room reservation).

FIG. 16 shows an exemplary method 1600 for defining a scope within a domain semantic model, in accordance with an embodiment of the present principles.

At step 1610, select the objects from the domain semantic model to include in the basis for generating documents.

A description will now be given of the activity of generating or regenerating document, in accordance with an embodiment of the present principles.

The input to this activity includes: a document template; and a subset of domain semantic models to be used for document generation.

The output from this activity includes: a generated interactive parameterized document.

Figure 17:
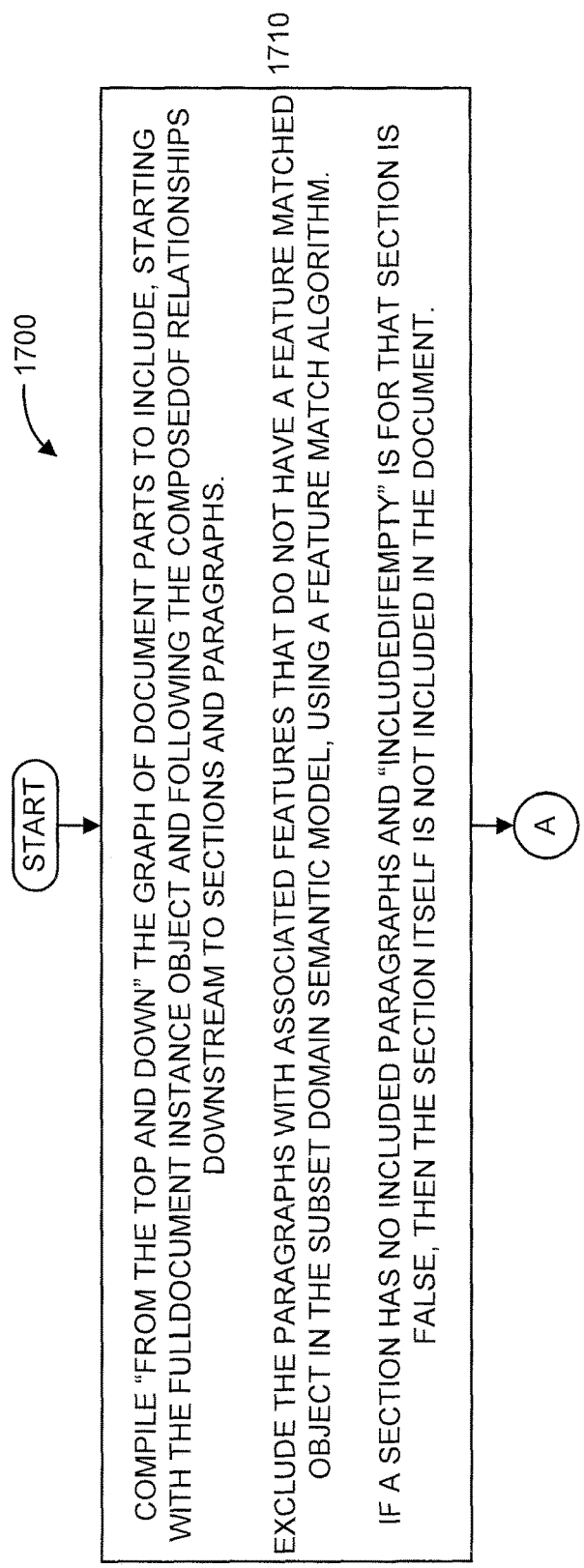
FIGS. 17-18 show an exemplary method 1700 for generating or regenerating document, in accordance with an embodiment of the present principles.
Figure 18:
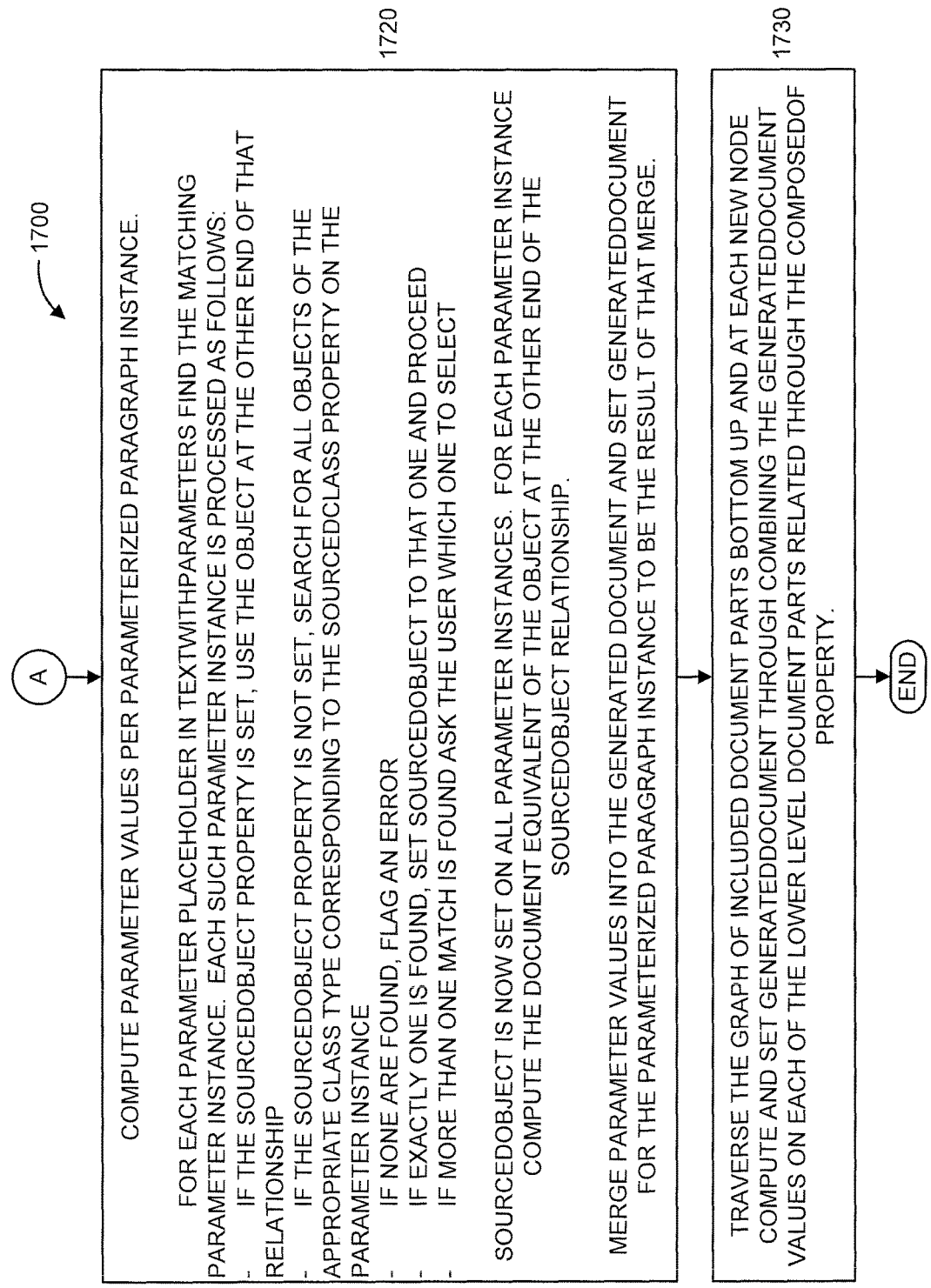

FIGS. 17-18 show an exemplary method 1700 for generating or regenerating document, in accordance with an embodiment of the present principles.

At step 1710, compile "from the top and down" the graph of document parts to include, starting with the FullDocument instance object and following the composedOf relationships downstream to sections and paragraphs.

Further regarding step 1710, exclude the paragraphs with associated features that do not have a feature matched object in the subset domain semantic model, using a feature match algorithm.

Also regarding step 1710, if a section has no included paragraphs (none of the optional possibilities were in fact selected/included) and "includedIfEmpty" is for that section is false, then the section itself is not included in the document.

At step 1720, compute parameter values per parameterized paragraph instance.

Further regarding step 1720, for each parameter placeholder in textWithParameters find the matching Parameter instance. Each such Parameter instance is processed as follows:

If the SourcedObject property is set, use the object at the other end of that relationship If the SourcedObject property is not set, search for all objects (in the subset domain model object graph) of the appropriate class type corresponding to the SourcedClass property on the Parameter instance If none are found, flag an error If exactly one is found, set SourcedObject to that one and proceed If more than one match is found ask the user (by "name") which one to select Also regarding step 1720, SourcedObject is now set on all Parameter instances. For each Parameter instance compute the document equivalent of the object at the other end of the SourcedObject relationship.

Additionally regarding step 1720, merge parameter values into the generated document (remembering their origin parameter to support later navigation back to the underlying domain semantic object) and set generatedDocument for the parameterized paragraph instance to be the result of that merge (by value, not by reference).

At step 1730, traverse the graph of included document parts bottom up and at each new node compute and set generatedDocument through combining the generatedDocument values on each of the lower level document parts related through the ComposedOf property.

At the end of this process, the resulting generated document is the value of the generatedDocument property on the FullDocument instance object in the document template. Note that document generation can be human or system triggered, including possibly triggered automatically when a user switches to a "document view" of a domain semantic model that he or she is working on (i.e. navigating from semantic object to generated document)

A description will now be given of a feature match algorithm, in accordance with an embodiment of the present principles.

If a paragraph does not have an associated feature, then it is always part of the document. This supports predefined mandatory paragraphs If the paragraph has one or more associated features, then it is only part of the document if it also has at least one associated "related object". This supports the use of "optional paragraphs", i.e., they are only included in the document if in fact an object exists in the subset domain semantic model that "binds" to them.

Semantic objects in the subset domain semantic model can have defined feature properties (relationships to Feature instances) and "matches" (aka RelatedObject relationships) with paragraphs (that have features) are computed as follows. If there, given the features defined on the domain semantic object, is only one possible paragraph match in the document template then establish relationships (both directions) to that paragraph. If there is more than one option there is already a feature match relationship (on RelatedObjects) and that option is still viable (given the now assigned features), do not do anything (i.e. existing match remains). Otherwise, if there is more than one possibility, ask the user which paragraph to bind to (by "name"). It is to be noted that only paragraph objects that are part of the document template object graph are applicable to be selected.

A description will now be given of the activity of navigating from a document parameter to a domain ontology object, in accordance with an embodiment of the present principles.

The input to this activity includes: a generated document; and a subset of domain semantic models that was used for document generation.

FIG. 19 shows an exemplary method 1900 for navigating from a document parameter to a domain ontology object, in accordance with an embodiment of the present principles.

At step 1910, select (by the user) a parameter (macro point) in the generated document.

At step 1920, activate (by the user) the navigation to the underlying domain semantic model object.

At step 1930, look up (by the system) the Parameter instance associated with the parameter (macro point) in the generated document and navigate to the domain semantic model object referred to by the SourcedObject property of the Parameter instance.

A description will now be given of the activity of navigating from a domain ontology object to a document, in accordance with an embodiment of the present principles.

The input to this activity includes: a generated document; and a subset of domain semantic models that was used for document generation.

FIG. 20 shows an exemplary method 2000 for navigating from a domain ontology object to a document, in accordance with an embodiment of the present principles.

At step 2010, select (by the user) a domain semantic model object and activate the navigation to the generated document.

At step 2020, find (by the system) the Parameter instance associated with the selected domain semantic model object (if no such Parameter instance exists, the domain semantic model object is not the base for a parameter and an error is returned) and navigate to the generated document, positioning the user at the parameter (macro point) in the generated document.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method, comprising:
providing an actionable business entity operating model; and
extending the actionable business entity operating model to drive user interface behavior on a user interface device having at least a display device, by extending class and property meta classes of the actionable business entity operating model to include user interface behavior semantics, defining rules for editing semantic objects based on the user interface behavior semantics, and defining which particular actions are executable at each of one or more particular lifecycle states at a class level,
wherein said extending step comprises configuring the user interface behavior semantics to be responsive to an operation state of the actionable business entity operating model, the user interface behavior being adjusted based on the rules for editing semantic objects, and
wherein the actionable business entity operating model comprises a plurality of classes, and said extending step further comprises defining a display sequence for the user interface as a pseudo number a respective one of the plurality of classes has in the display sequence, wherein multiple classes from among the plurality of classes can have a same pseudo number that is resolvable at a runtime, and each of a plurality of class properties defines a relative display sequence within a respective one of the plurality of classes at the class level.

2. The method of claim 1, further comprising configuring the user interface behavior semantics to allow end users of the user interface device to act as actionable business entities through the user interface device.

3. The method of claim 1, wherein the user interface behavior semantics comprise at least one of an object visibility, an attribute visibility, a display sequence, a display name, a display width, a user editing rule, a user creation rule, and a special editor use.

4. The method of claim 1, wherein the user interface behavior semantics comprise an ability to control at which lifecycle state of semantic objects in a resulting extended actionable business entity operating model particular aspects of the semantic objects can be manipulated in the user interface.

5. The method of claim 1, wherein the user interface behavior semantics comprise actions in the actionable business entity operating model which have a respective corresponding interaction with a user.

6. The method of claim 5, wherein the actions in the actionable business entity operating model which have the respective corresponding interaction with the user are variable responsive to a lifecycle state of a business entity instance.

7. The method of claim 1, wherein the user interface comprises a form of an interactive parameterized document.

8. The method of claim 7, wherein portions of the interactive parameterized document are expressed as objects in a document ontology.

9. The method of claim 7, wherein parameters of the interactive parameterized document are expressed as objects in a document ontology and related to domain ontology objects that provide values for the parameters.

10. The method of claim 1, wherein the actionable business entity operating model comprises a plurality of classes, and said extending step further comprises defining associated semantic object special editors for select ones of the plurality of classes and for select properties of the select ones of the plurality of classes.

11. The method of claim 10, wherein for each of the plurality of classes having actions triggered by a user role and that require user interaction by the user role, said defining step comprises refining a definition of the user interaction by the user role responsive to defining, using the associated semantic object special editors, user triggering or the user interaction by the user role based on a lifecycle state of one or more business entities relating to the actionable business entity operating model.

12. The method of claim 1, wherein the actionable business entity operating model comprises a plurality of classes, and said extending step further comprises defining a display width of a semantic object for a property of at least one of the plurality of classes by defining the display width for a value field of the property in the user interface.

* * * * *